United States Patent [19]

Newsome

[11] Patent Number: 4,457,960

[45] Date of Patent: Jul. 3, 1984

[54] POLYMERIC AND FILM STRUCTURE FOR USE IN SHRINK BAGS

[75] Inventor: David L. Newsome, Neenah, Wis.

[73] Assignee: American Can Company, Greenwich, Conn.

[21] Appl. No.: 371,781

[22] Filed: Apr. 26, 1982

[51] Int. Cl.$^3$ .................. B32B 27/08; B65D 71/08
[52] U.S. Cl. .................... 428/35; 206/497; 383/113; 383/908; 428/516; 428/518; 428/520; 525/222
[58] Field of Search ........... 428/518, 516, 520, 35; 206/497; 229/DIG. 12; 525/222

[56] References Cited

U.S. PATENT DOCUMENTS

| | | | |
|---|---|---|---|
| 3,399,250 | 8/1968 | Kirk et al. | 525/222 |
| 3,422,055 | 1/1969 | Maloney | 525/222 |
| 4,239,826 | 12/1980 | Knott et al. | 428/518 |
| 4,247,584 | 1/1981 | Widiger et al. | 428/518 |
| 4,254,169 | 3/1981 | Schroeder | 428/518 |
| 4,278,738 | 7/1981 | Bray et al. | 428/518 |
| 4,289,830 | 9/1981 | Knott | 428/516 |
| 4,339,507 | 7/1982 | Kurtz et al. | 525/222 |
| 4,357,191 | 11/1982 | Bullard et al. | 428/516 |
| 4,357,376 | 11/1982 | Nattinger et al. | 428/518 |
| 4,364,981 | 12/1982 | Horner et al. | 428/516 |
| 4,367,256 | 1/1983 | Biel | 428/516 |
| 4,405,667 | 9/1983 | Christensen et al. | 428/516 |

FOREIGN PATENT DOCUMENTS 2097324 11/1982 United Kingdom .

Primary Examiner—William R. Dixon, Jr.
Attorney, Agent, or Firm—Stuart S. Bowie; Thomas D. Wilhelm

[57] ABSTRACT

Linear low density polyethylene is used in multiple layer, molecularly oriented films. Novel blends of linear low density polyethylene with ethylene vinyl acetate copolymer are disclosed, and used in molecularly oriented multiple layer films. Bags made from the multiple layer films are especially useful for shrink packaging, and particularly for shrink packaging of meats having large cavities.

26 Claims, 3 Drawing Figures

POLYMERIC AND FILM STRUCTURE FOR USE IN SHRINK BAGS

BACKGROUND OF THE INVENTION

Heat shrinkable polymer films have gained substantial acceptance for such uses as the packaging of meats. This description will detail the usage of films for packaging meat; it being understood that these films are also suitable for packaging other products. Some of the films embodying this invention are normally used as heat shrinkable bags supplied to the meat packer with one open end, to be closed and sealed after insertion of the meat. After the product is inserted, air is normally evacuated, the open end of the bag is closed, such as by heat sealing, or applying a metal clip, and finally heat is applied, such as by hot water, to initiate film shrinkage about the meat.

In subsequent processing of the meat, the bag may be opened and the meat removed for further cutting of the meat into user cuts, for retail sale, for example, or for institutional use.

Successful shrink bags must satisfy a multiplicity of requirements imposed by both the bag producer and the bag user. Of primary importance to the bag user is the capability of the bag to survive physically intact the process of being filled, evacuated, sealed closed, and heat shrunk. The bag must also be strong enough to survive the material handling involved in moving the contained meat, which may weigh 100 pounds or more, along the distribution system to the next processor, or to the user. Thus, the bag must physically protect the meat.

It is also highly desirable to the bag user that the bag serve as a barrier to infusion of gaseous materials from the surrounding environment. Of particular importance is provision of an effective barrier to infusion of oxygen, since oxygen is well known to cause spoilage of meat.

The bag producer requires a product which can be produced competitively while meeting the performance requirements of the user. Thus the bag material should be readily extrudable, and susceptible to orientation, with sufficient leeway in process parameters as to allow for efficient film production. The process should also be susceptible to efficient extended production operations. In the orientation process, the film must be tough enough to withstand the stretching. The orientation temperature should be a temperature which is economically achieved by the producer, and which provides for use of economical shrink processes by the bag user.

Conventional shrink bags have generally been constructed with ethylene vinyl acetate copolymers (EVA). In some cases the bags contain a layer of a saran copolymer to serve as an oxygen barrier. Ethylene vinyl alcohol copolymer (EVOH) has also been suggested as the barrier layer. In my pending application, Ser. No. 290,172, I disclose blends of EVOH preferred for use in the barrier layer of shrink bags.

Notwithstanding the advantages, shrink-bag packaging of meat is not without its difficulties, many of which are attributable to limitations in the film. As will be appreciated, the processes of stretching the film, and later shrinking it, expose the film to rather severe conditions, due to the nature of the operations.

It is especially important to appreciate that the film is particularly vulnerable to failure at conditions of operation, due to the relatively high temperatures to which it is exposed in the orientation and shrinking processes.

The film must be susceptible to orientation without distortion, or separation of the multiple layers which are normally present in films of this nature. The film must be strong enough, at the orientation temperature to withstand the stretching without the creation of holes, tears, or non-uniform zones of stretching.

In the case of blown tubular film, the film must be capable of supporting the stretching bubble during the orientation process. Finally, each of the layers of the film should be susceptible to orientation without fracture, separation, or creation of holes in the layer.

In packaging use, the film must respond to heat rapidly enough for commercial practicality, and yet must not exhibit such a level of shrink energy as would cause the film to pull apart or delaminate during shrinkage, under its own internal forces. Moreover, the shrink-related problems are seriously increased when the contained cut of meat includes protruding bones and/or significant cavities in its surface.

Particularly in the case of cavities in the meat, such as around the interior of the rib section, the redistribution of an area of the film adjacent the cavity places especially severe strains on the ability of the film to conform to the meat in the shrinking process while maintaining film continuity. All too commonly, the film may develop holes in the cavity area, thus breaching the physical and chemical protective barriers which it is desirous that the packaging film provide to the contained product.

Thus it is an object of the invention to provide improved film structure for use in shrink bags—wherein the shrink bags are capable of withstanding production and shrink processes. It is a special object to provide bags which can withstand intact the shrink processes wherein a contained product, such as meat, has a large cavity.

SUMMARY OF THE INVENTION

A preferred form of the invention is an oriented multiple layer polymeric film. In one embodiment, the film has a first barrier layer, the first layer having two opposing surfaces. A second layer is firmly adhered to one surface of the first layer, the second layer being 10% to 90% LLDPE and 90% to 10% EVA. A third layer is firmly adhered to the other surface of the first layer, the composition of the third layer being either (i) an EVA or (ii) a blend of 10% to 90% LLDPE with 90% to 10% of an EVA.

Another embodiment likewise has a first barrier layer with two opposing surfaces. Second and third layers are firmly adhered to the surfaces of the first layer, the second and third layers both having essentially the same compositions, each as the other, and comprising a first pair of layers. Fourth and fifth layers are firmly adhered to the second and third layers on the respective surfaces opposite the first layer, the fourth and fifth layers having essentially the same compositions, each as the other, and comprising a second pair of layers. In the combined composition of the first and second pairs of layers, at least one of the pairs has at least 50% of an EVA, the remainder being LLDPE and at least one of the pairs comprises at least 10% LLDPE, the remainder being the above recited EVA.

In preferred structures of this embodiment of the invention, the first pair of layers comprises 70% to 100% EVA and the second pair of layers comprises 10% to 90% LLDPE. In some embodiments, the first pair of layers is 100% EVA and the second pair of layers is 50% to 90% LLDPE.

In an embodiment involving a partial reversal of roles, the first pair of layers comprises 50% to 100% LLDPE and the second pair of layers comprises 50% to 100% EVA. In an especially preferred structure of this embodiment, the first pair of layers comprises 90% to 100% LLDPE and the second pair of layers comprises 90% to 100% EVA.

Still another preferred embodiment of the invention is another oriented multiple layer polymeric film. As in previous embodiments, a first barrier layer has two opposing surfaces. Second and third layers are firmly adhered to the surfaces of the first layer, the second and third layers both having essentially the same compositions, each as to the other. A fourth layer is firmly adhered to one of the second and third layers. A fifth layer is firmly adhered to the fourth layer. The second and third layers comprise an EVA. The fourth layer comprises 10% to 100% LLDPE and 0% to 90% EVA, and the fifth layer comprises an EVA.

In a preferred version of this embodiment of the invention, the fourth layer is 100% LLDPE.

In all the multiple layer films of the invention, the barrier layer is preferably either polyvinyl chloride-polyvinylidene chloride copolymer (saran) or EVOH, or a blend of EVOH.

In structuring the various films of the invention, it is preferred that the overall composition of the film be 20% to 30% LLDPE.

A substantial end use of the invention is in heat sealable shrink bags for utilization particularly in packaging of meat, especially meat having bony projections or large cavities. Bags made according to the invention find particular utility in forming packages which are subjected to high temperature shrinking processes.

DETAILED DESCRIPTION OF THE INVENTION

Figure 1:
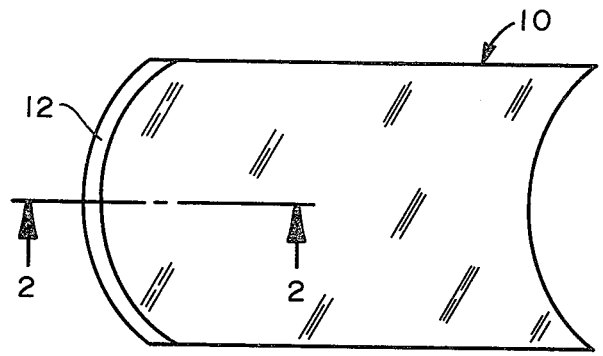
FIG. 1 is a plan view of a bag made according to the invention.

FIG. 1 shows a bag 10 made according to the invention. The empty bag shown is a collapsed, molecularly oriented tube with one end closed by a heat seal 12 across the one end of the tube. The other end of the bag is open for insertion of meat, and it is normally closed and sealed when the meat is put into the bag.

Figure 2:
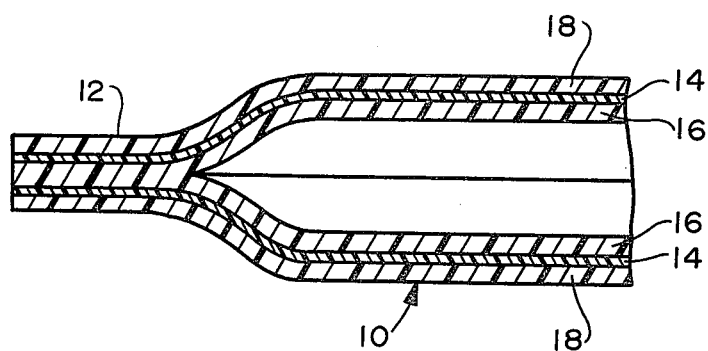
FIG. 2 is a cross-section of the bag of FIG. 1 taken at 2—2 of FIG. 1.

The cross-section of the bag in FIG. 2 shows a typical structure where the bag is made from a three-layer coextruded plastic film. Layer 14 is a barrier layer which minimizes the transmission of oxygen through the film. Preferred barrier layer materials are saran, EVOH, and blends of EVOH. Layer 16 is the heat seal layer. Layer 18 is the outer bag layer and serves a primary function of protecting the package and its product from physical abuse. In the form of the invention using a three-layer film as in FIG. 2, layer 18 is a blend of 10 weight percent to 100 weight percent of an EVA and 90 weight percent to 0 weight percent LLDPE. Layer 16 is 10% to 100% of an EVA and 0% to 90% LLDPE. Independent of the individual compositions of layers 16 and 18, either of which may be 100% EVA, one of the layers 16 and 18 must contain at least 10% LLDPE.

In engineering the specifications for a specific film of the invention, one deals with the following independent variables: barrier layer composition and thickness, the specific EVA, the specific LLDPE, the ratio of EVA/LLDPE in the sealant layer 16 and the exterior layer 18 and the thicknesses of layers 16 and 18, and the overall thickness of the film.

The overall thickness of films of this invention is nominally the same as the thickness of conventional films. Films are generally about 2.0 mils thick with a normal range of 1.5 to 3.0 mils. Films thinner than 1.5 mil tend to be too weak to perform all required functions. Films thicker than 3.0 mils are economically unable to compete with thinner, competitive films.

LLDPE polymers suitable for use in this invention are those having a melt index (MI) of up to about 6. Preferred LLDPE polymers have an MI of 0.5 to 1.5. Among the preferred polymers are 2045 from Dow Chemical Company and 11P from DuPont Company.

As used herein, the term melt index refers to the physical property determination described in ASTM-D1238.

Preferred EVA's are those having 6% to 12% vinyl acetate (VA) content and a melt index less than 1. While blend amounts are shown herein in weight percent, VA contents are mole percent. Especially preferred EVA's have VA content of 7% to 9% and melt index of 0.2 to 0.8.

The ratio of percent LLDPE in the blend is selected to provide the best balance of properties which maximizes the desirable benefits of each of the elements of the blend. The EVA provides high levels of adhesion to the barrier layer when the barrier layer is saran or certain ones of the EVOH blends disclosed in my application Ser. No. 290,172 herein incorporated by reference. EVA's having greater than about 85% ethylene also provide substantial structural strength to the film during the orientation process, and are especially beneficial for the orientation of tubular films. The LLDPE is highly desired for its capability of surviving intact the processes involved in shrinking the shrink bag, and in general, the ability of shrink bags to withstand the shrinking process correlates directly with increasing percent LLDPE. In designing the bag, the desire to increase that percentage to improve shrink performance is tempered, however, by the other demands on layers 16 and 18 which are better met by the EVA. Initial improvements in the film, compared to films having straight EVA in layers 16 and 18, are seen in films having as little as 10% LLDPE in layers 16 and 18. Films having 20% to 30% LLDPE show marked improvements. Films having higher percentages of LLDPE, such as 50% to 90% have even better shrink performance, but are increasingly more difficult to stabilize in the manufacturing process. Films having 100% LLDPE in either layer 16 or 18 are not preferred because of difficulties in manufacturing them.

The thickness of each layer of the film of this invention is essentially the same as the same layer in conventional shrink films. By way of example in a typical film used to make the bag of FIGS. 1 and 2, the overall film thickness is 2.25 mils. Layers 14 and 18 are 0.4 mil, and layer 16 is 1.45 mils.

The barrier layer is preferrably either saran or EVOH or a blend of EVOH. Saran is a well known and well accepted barrier material. The use of LLDPE in the outer layers of three layer structures where saran is the barrier layer, provides to the user the benefit of up-grading a known packaging material. However, the benefits of using an EVOH or EVOH blend as the barrier material have been thoroughly researched and described. Combining an EVOH blend as the barrier layer 14 with LLDPE-EVA blends in layers 16 and 18 provides a superior film. The EVA and EVOH blends contribute to facilitating manufacturing processability. The LLDPE contributes to improved shrink performance. The EVOH blend may, in addition, provide superior oxygen barrier.

The films described herein are susceptible to being manufactured according to conventional orientation processes. In the following examples, a few films are described in detail as being manufactured using equipment common to the "double bubble" process. Other films of the invention, iterated in a later tabulation, may be made by this or other conventional processes. Choice of the desired process depends not only on the film composition and structure but also on specific properties desired; and thus these choices on any given film are a matter of engineering selection.

EXAMPLES 1–4

Example 1A is a control film having a core layer of saran and outer layers of an EVA identified as 3638, and having a melt-index of 0.4 and a VA content of 7.5%. The saran and EVA were plasticated and melt extruded through three separate extruders into a three-layer die and formed into a three layer tubular film on conventional "double bubble" equipment. The resulting film was biaxially oriented, with a stretch factor of approximately 3/1 in each the with-machine direction and the cross-machine direction. The oriented film was 2.25 mils thick; and was composed of: 1.45 mils sealant layer of 3638 EVA, 0.4 mil saran barrier layer, and a 0.4 mil outer layer of 3638 EVA. EXAMPLE 1B was the same as EXAMPLE 1A except that 80232 EVA was used in place of 3638 EVA.

Example 2 was the same as Example 1A except that a blend of EVA and LLDPE was substituted for the sealant layer. The outer and barrier layers were unchanged. For the sealant layer, 30 parts by weight of pellets of Dowlex 2045 LLDPE were dry blended with 70 parts by weight of pellets of 1060 EVA. The blended composition, and the 3638 and saran, respectively were extruded through three extruders and oriented as in EXAMPLE 1. The resulting film had the same interlayer structural relationships as in EXAMPLE 1, namely 1.45 mils sealant layer 0.4 mil barrier layer, and 0.4 mil outer layer.

In EXAMPLE 3, a film was made having the same interlayer structure and dimensions as in EXAMPLES 1 and 2, with only the layer compositions being changed. The composition of the sealant layer and the outer layer were formed by dry blending as in EXAMPLE 2, pellets of the respective polymers used. Both the sealant and outer layers were 30% by weight Dowlex 2045 LLDPE and 70% UE-657 EVA.

For EXAMPLE 4, a film having the same layer structure and dimensions was made as in EXAMPLE 3, with the outer and sealant layers being a blend of 30% 2045 LLDPE and 70% 80232 EVA.

TABLE 1 shows significant properties of the above cited polymers and the polymers cited in subsequent examples and structures.

TABLE 1

| Cited Polymer | Polymer Properties | | |
|---|---|---|---|
| | Type of Polymer | Melt Index | % VA Content |
| LD 310.09 | EVA | 2.3 | 9.0 |
| NA 235 | EVA | 0.35 | 4.5 |
| NPE 490 | EVA | 0.5 | 8.0 |
| Plexar (1) | EVA, modified | 1.0 | 4.0 |
| UE 643 | EVA | 9.0 | 20 |
| UE 655 | EVA | 2.0 | 9.0 |
| UE 657 | EVA | 0.5 | 12 |
| 360 | EVA | 2.0 | 25 |
| 1060 | EVA | 0.5 | 7.5 |
| 3120 | EVA | 1.2 | 7.5 |
| 3121 | EVA | 0.5 | 7.5 |
| 3134 | EVA | 8.0 | 12 |
| 3135X | EVA | 0.35 | 12 |
| 3165 | EVA | 0.7 | 18 |
| 3638 | EVA | 0.4 | 7.5 |
| 80232 | EVA | 0.38 | 9.5 |
| 11P | LLDPE | 0.7 | — |
| 2035 | LLDPE | 6.0 | — |
| 2045 | LLDPE | 1 | — |

The films of EXAMPLES 1-4 were made into bags by cutting the tubular film into lengths and sealing one end by conventional heat sealing techniques. The resulting bags were subjected to shrink tests using a specially designed test block insertion in the bag. The test block consisted of a rectangular wooden block of a size which approximated the volume of meat normally placed in that size bag. The test block included on its surface a plurality of holes of uniform cross-section, the holes being nominally 3 inches across and 1½ inches deep—the holes simulating the cavities encountered in some meat cuts.

After the block was inserted into a given bag, the bag was evacuated and sealed closed. The sealed bag was then passed through a conventional hot water shrink process with water temperature controlled at 204° F. to 206° F. After passing through the shrink process the bags were evaluated for bag integrity, observing particularly for holes in the bag in or near the cavities. Bags having no holes were judged as passing the test. Bags having one or more hole were judged as failing the test. TABLE 2 shows the results of the tests for EXAMPLES 1–4.

TABLE 2

| Example No. | Shrink Test Results | | |
|---|---|---|---|
| | No. of Bags Tested | Passed | Failed | Percent Passing |
| 1A (control) | 10 | 0 | 10 | 0% |
| 1B (control) | 5 | 0 | 5 | 0% |
| 2 | 5 | 3 | 2 | 60% |
| 3 | 5 | 4 | 1 | 80% |
| 4 | 10 | 10 | 0 | 100% |

While TABLE 2 shows a range of degrees of improvement over the control films, all the films that contained LLDPE did show significantly improved performance as compared to the control film. Even EXAMPLE 2, which had LLDPE only in the sealant layer showed a 60% pass rate compared to 0% for the control.

Additional three layer structures illustrative of the invention are:
/inner layer/barrier layer/outer layer/
/10% 2045-90% 3135x/saran/10% 2045-90% 3135/
/30% 2045-70% UE657/saran/30% 2045-70% UE657/
/40% 2045-60% UE657/saran/40% 2045-60% UE657/

/50% 2045-50% UE657/saran/50% 2045-50% UE657/
/60% 2045-40% UE657/saran/60% 2045-40% UE657/
/70% 2045-30% UE657/saran/70% 2045-30% UE657/
/40% 2035-60% UE657/saran/40% 2035-60% UE657/
/40% 11P-60% UE657/saran/40% 11P-60% UE657/
/40% 2045-60% UE657/saran/100% 3638/
/40% 2045-60% UE657/saran/100% 3121/
/40% 2045-60% UE657/saran/100% UE657/
/30% 2045-70% 1060/saran/30% 2045-70% 1060/
/20% 2045-80% 3121/saran/20% 2045-80% 3121/
/20% 2045-80% 3124/saran/20% 2045-80% 3124/
/30% 2045-70% 310.09/saran/30% 2045-70% 310.09/
/40% 2045-60% 3134/saran/40% 2045-60% 3134/
/60% 2045-40% 3165/saran/60% 2045-40% 3165/
/60% 2045-40% UE643/saran/60% 2045-40% UE643/
/70% 2045-30% 360/saran/70% 2045-30% 360/

Thus it is seen that LLDPE may be blended with a large family of EVA's with the films being susceptible of stretching by means of conventional processes, and the films capable of surviving the stretching process intact.

Figure 3:
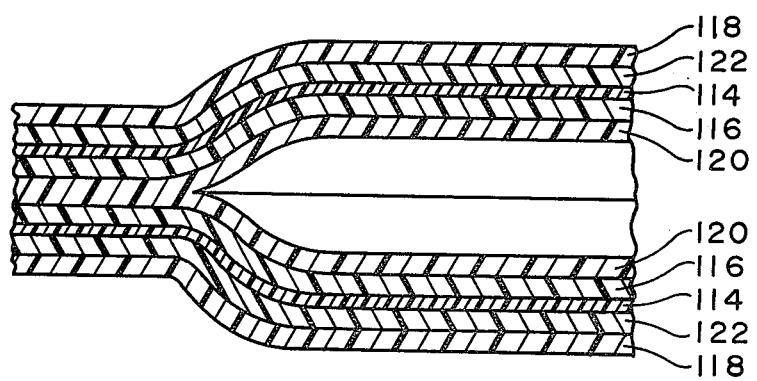
FIG. 3 is a cross-section as in FIG. 2, but showing a 5-layer bag structure.

A more complex form of the invention is an oriented 5-layer polymeric structure as seen in FIG. 3. In this structure, layer 114 typically represents the barrier layer. Layer 118 serves as the exterior, abuse-resistant layer. Layer 120 is the sealant layer. Layers 116 and 122 serve as transition layers, or compatibilizing layers between the layer 114 and the layers 118 and 120. Layers 116 and 122 may also provide, as can any of the layers, certain desirable structural and strength benefiting properties.

In typical structures, like polymeric compositions in layers 116 and 122 and also in layers 118 and 120 provide chemical balance of properties centered physically about barrier layer 114. Thus layers 116 and 122, in their normal functions, may serve as chemical as well as physical bridges to layer 114. Since they are not subjected to the physical and chemical abuses imposed on the sealant layer, such as 120, and the outer layer, such as 118, the composition and thickness of layers 116 and 122 may, in many cases, be selected for their desirable properties somewhat independently of those properties required of the external layers by external abuses imposed directly on them. Thus layers 116 and 122 may be selected with substantial freedom to reinforce the film in functionally weaker areas.

In one structure, layer 114 is saran, layers 116 and 122 are EVA and layers 118 and 120 are either LLDPE or a blend of LLDPE with EVA. In another structure, layer 114 is saran, layers 116 and 122 are LLDPE and layers 118 and 120 are EVA. Likewise, both pairs of layers, wherein 116 and 122 are a first pair and 118 and 120 are a second pair, may be blends of LLDPE and EVA.

In an unbalanced structure also illustrated by FIG. 3, layer 116 is the barrier layer, layers 114 and 120 are EVA, layer 122 is LLDPE and layer 118 is EVA. Other 5-layer structures incorporate EVOH as the barrier layer. In light of the entire foregoing description of the invention, the following are thus illustrative of 5-layer structures of the invention, the first mentioned layer being layer 120.

/EVA/saran/EVA/LLDPE/EVA/
/EVA-LLDPE blend/saran/EVA-LLDPE blend/LLDPE/EVA/
/EVA/saran/EVA/EVA-LLDPE blend/EVA/
/EVA/LLDPE/saran/LLDPE/EVA/
/EVA/LLDPE-EVA blend/saran/LLDPE-EVA blend/EVA/
/LLDPE-EVA blend/EVA/saran/EVA/LLDPE-EVA blend/
/LLDPE-EVA blend/EVA/saran/EVA/LLDPE/
/EVA/Plexar/EVOH-LLDPE blend/Plexar/EVA/
/EVA/LLDPE-Plexar blend/EVOH/LLDPE-Plexar blend/EVA/
/EVA-LLDPE blend/Plexar/EVOH/Plexar/EVA-LLDPE blend/
/EVA/EVOH/Plexar/LLDPE/EVA/
/EVA/EVOH/Plexar/LLDPE-EVA blend/EVA/
/Plexar/EVOH/Plexar/LLDPE-EVA blend/EVA/
/Plexar/EVOH-LLDPE blend/Plexar/LLDPE/EVA/
/Plexar/EVOH-LLDPE blend/Plexar/EVA/EVA/

Other permutations of the above oriented 5-layer structures will now be obvious to those skilled in the art. Common to all of them is the presence of LLDPE, either as a separate layer or as a component of a blend layer.

Having thus described the invention, what is claimed is:

1. An oriented multiple layer polymeric film, comprising:
   (a) a first barrier layer, said first layer having two opposing surfaces;
   (b) second and third layers adhered to said surfaces of said first layer, said second and third layers both having essentially the same composition;
   (c) a fourth layer adhered to one of said second and third layers; and
   (d) a fifth layer adhered to said fourth layer;
   said second, third and fifth layers comprising ethylene vinyl acetate, and said fourth layer comprising 10% to 100% linear low density polyethylene.

2. An oriented film as in claim 1 wherein said barrier layer comprises polyvinyl chloride-polyvinylidene chloride copolymer.

3. An oriented film as in claim 1 wherein said barrier layer comprises ethylene vinyl alcohol copolymer.

4. An oriented multiple layer polymeric film, comprising:
   (a) a first barrier layer, said first layer having two opposing surfaces;
   (b) a second layer adhered to one said surface, said second layer being 10% to 90% linear low density polyethylene and 90% to 10% ethylene vinyl acetate; and
   (c) a third layer adhered to the other said surface, the composition of said third layer being selected from the group consisting of (i) ethylene vinyl acetate, and (ii) blends of 10% to 90% linear low density polyethylene with 90% to 10% ethylene vinyl acetate.

5. An oriented film as in claim 4 wherein said barrier layer comprises polyvinyl chloride-polyvinylidene chloride copolymer.

6. An oriented film as in claim 4 wherein said barrier layer comprises ethylene vinyl alcohol copolymer.

7. An oriented film as in claim 5 or 6 wherein said third layer is a blend of 10% to 90% linear low density polyethylene and 90% to 10% ethylene vinyl acetate.

8. An oriented film as in claim 7 wherein said second and third layers are 20% to 40% linear low density polyethylene and 60% to 80% ethylene vinyl acetate, said ethylene vinyl acetate having a vinyl acetate content of 6% to 12% and a melt index of 0.3 to 0.9; said linear low density polyethylene having a melt index of 0.5 to 1.5.

9. An oriented multiple layer polymeric film comprising:
  (a) a first barrier layer, said first layer having two opposing surfaces;
  (b) second and third layers adhered to said surfaces of said first layer, said second and third layers both having essentially the same composition and comprising a first pair of layers; and
  (c) fourth and fifth layers adhered to said second and third layers on the respective surfaces opposite said first layer, said fourth and fifth layers having essentially the same composition and comprising a second pair of layers;
  in the combined composition of said first and second pairs of layers, at least one of said pairs comprising at least 50% of an ethylene vinyl acetate component, the remainder of said one pair being a linear low density polyethylene; and at least one of said pairs comprising at least 10% linear low density polyethylene component, the remainder of said one pair being said ethylene vinyl acetate, where the requirement for said components of at least 50% ethylene vinyl acetate and said 10% linear low density polyethylene may be met by one of said pairs having both said components or by each of said pairs having one of said components.

10. An oriented film as in claim 9 wherein said barrier layer comprises polyvinyl chloride-polyvinylidene chloride copolymer.

11. An oriented film as in claim 9 wherein said barrier layer comprises ethylene vinyl alcohol copolymer.

12. An oriented film as in claim 9, 10, or 11 wherein said first pair of layers comprises 70% to 100% of said ethylene vinyl acetate and said second pair of layers comprises 10% to 90% linear low density polyethylene.

13. An oriented film as in claim 12 wherein said first pair of layers comprises 100% ethylene vinyl acetate and said second pair of layers comprises 50% to 90% linear low density polyethylene.

14. An oriented film as in claim 9, 10, or 11 wherein said first pair of layers comprises 50% to 100% linear low density polyethylene and said second pair of layers comprises 50% to 100% of said ethylene vinyl acetate.

15. An oriented film as in claim 14 wherein said first pair of layers comprises 90% to 100% linear low density polyethylene and said second pair of layers comprises 90% to 100% ethylene vinyl acetate.

16. An oriented film as in claim 1, 2 or 3 wherein said fourth layer is 100% linear low density polyethylene.

17. An oriented film as in claim 4, 5, 6, 9, 10, 11, 1 2, or 3 wherein the overall composition of said film comprises 20% to 30% linear low density polyethylene.

18. An oriented film as in claim 7 wherein the overall composition of said film comprises 20% to 30% linear low density polyethylene.

19. An oriented film as in claim 8 wherein the overall composition of said film comprises 20% to 30% linear low density polyethylene.

20. An oriented film as in claim 13 wherein the overall composition of said film comprises 20% to 30% linear low density polyethylene.

21. An oriented film as in claim 15 wherein the overall composition of said film comprises 20% to 30% linear low density polyethylene.

22. A shrink bag made from an oriented film of claim 17.

23. A shrink bag made from an oriented film of claim 18.

24. A shrink bag made from an oriented film of claim 19.

25. A shrink bag made from an oriented film of claim 20.

26. A shrink bag made from an oriented film of claim 21.

* * * * *